No. 696,317. Patented Mar. 25, 1902.
J. C. CULBERTSON.
NUT LOCK.
(Application filed Dec. 7, 1901.)
(No Model.)
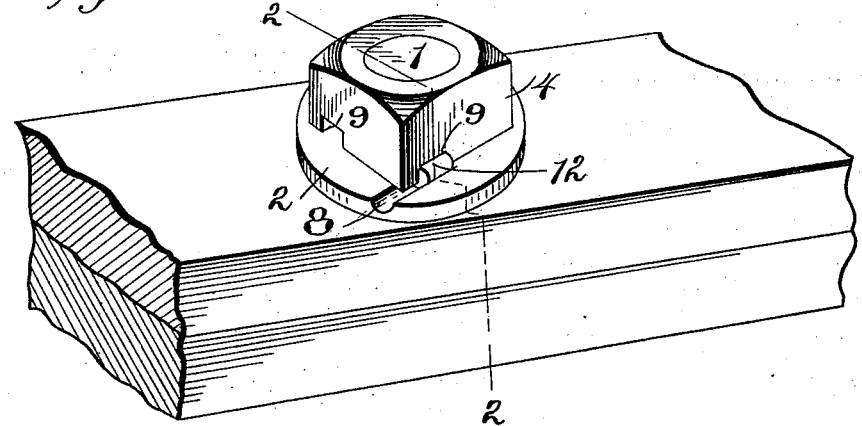
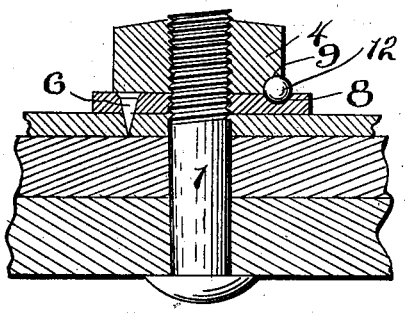
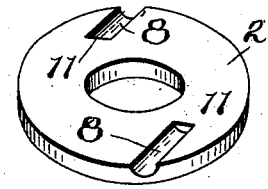
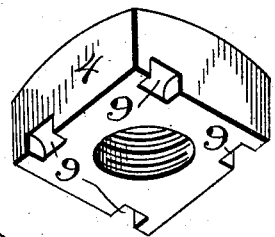
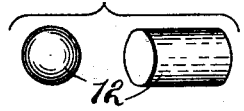
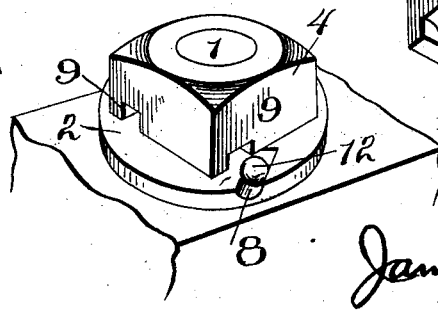
Witnesses
Geo. E. Frech.
C. R. Wright Jr.
Inventor
James C. Culbertson
By A. S. Pattison
Attorney

UNITED STATES PATENT OFFICE.

JAMES C. CULBERTSON, OF GOHEENVILLE, PENNSYLVANIA.

NUT-LOCK.

SPECIFICATION forming part of Letters Patent No. 696,317, dated March 25, 1902.

Application filed December 7, 1901. Serial No. 85,092. (No model.)

*To all whom it may concern:*

Be it known that I, JAMES C. CULBERTSON, a citizen of the United States, residing at Goheenville, in the county of Armstrong and State of Pennsylvania, have invented new and useful Improvements in Nut-Locks, of which the following is a specification.

My invention relates to improvements in nut-locks, and pertains to a nut-lock constructed and arranged to cause the locking of the nut through the intervention of a locking member located between a washer and the nut. The specific form constituting my improvements will be fully described hereinafter.

The object of my invention is to provide a simple and efficient nut-lock adapted to prevent the loosening of the nut in all situations, the same being so constructed that the nut can be easily released for the purpose of removing it and when in its locked position is firmly and rigidly held against unscrewing from its bolt, and thus preventing serious accidents occurring in almost all situations where bolts and nuts are used and the consequent injury to persons and property.

In the accompanying drawings, Figure 1 is a perspective view of my improved nut-lock, showing the nut screwed home and locked in its adjusted position. Fig. 2 is a transverse sectional view on the line 2 2 of Fig. 1. Fig. 3 is a detached perspective view of the washer embodying a part of my invention. Fig. 4 is a detached inverted perspective view of a nut embodying a part of my invention. Fig. 5 is a detached perspective view of a roller or ball constituting the locking member of my improved nut-lock. Fig. 6 is a perspective view showing my invention in position ready to be turned to its locking position.

In the accompanying drawings, 1 is a bolt of the ordinary structure.

2 is a washer, which may be of any desired peripheral contour, here shown circular.

4 is a nut, which may also be of any desired peripheral contour without affecting the spirit or scope of my invention. As here shown, the nut is square in contour; but the contour of the nut does not form any part of my invention and the angular contour may be varied without in any manner affecting it, which is also likewise so of the washer.

My improved washer is provided with one or more projections 6 upon its inner side, the projections being, preferably, formed by a punching operation, and the said projection adapted to either enter an opening 7, formed in a metal plate 8, as here shown, or may enter directly a piece of wood without the intervention of the metal plate, as will be readily understood. The function of this projection is to prevent the washer from turning. The outer side of the washer is provided with any desired number of grooves 8, and the inner and adjacent side of the nut is provided with any desired number of recesses or pockets 9. The grooves in the washer have open outer ends, and the pockets or recesses in the nuts are also provided with open outer ends and inner abutting walls 11.

12 is a locking member, here shown in the form of a short roller, but may be made in the form of a ball or shot.

The operation of my invention in the placing of the parts in position is shown in Fig. 6. In this figure it will be noticed that the nut is turned home or tight and there is exposed one of the grooves of the washer and one side or flat portion of the nut. Into this groove the locking member 12 is placed and the nut turned slightly backward until the locking member becomes inclosed and wedged into the adjacent pocket or recess of the nut. The amount of backlash or back movement required to lock the nut will depend, as will be readily understood, upon the number of grooves formed in the washer and the number of pockets formed in the nut. There will be placed at each corner of the nut (whatever its angular contour may be) a recess or pocket, and there will be any desired number of grooves in the washer, and the distance between the grooves in the washer and between the pockets in the nuts will indicate the amount of backward movement of the nut necessary to lock it in position. The grooves in the washer can be made so close together that the backward movement is but slight and not sufficient to perceptibly affect the firm clamping of the parts by the nut and bolt. When it is desired to remove the nut, it is turned up a slight distance sufficient to permit the removal of the locking member, as shown in Fig. 6, when the locking member 12 can be removed and the nut unscrewed.

It will be noted that the pocket or recess or recesses in the nut are eccentrically arranged, whereby a rotation of the nut in one direction, as before explained, will cause the exposure of the locking member 12, and when turned in the other direction will cause the locking member to enter the said recess. It will also be noted that the grooves in the washer are here shown and preferably extend in a line parallel to a tangent in respect to the axis of the washer. It will also be noted that the recess or pocket in the nut extends in a direction substantially transverse the groove or grooves in the washer, whereby the shoulders of the groove and the inner wall of the pocket or recess with the intervening locking member will prevent the nut from unscrewing.

Having thus described my invention, what I claim, and desire to secure by Letters Patent, is—

1. An improved nut-lock, comprising a washer provided with a groove, and a nut having a recess extending in a direction substantially transverse the groove, the recess having an inner end wall, and an outer open end, substantially as described.

2. An improved nut-lock, comprising a washer provided with a groove, and an angular nut having at each corner a recess extending in a direction substantially transverse said washer-groove, said recesses having an inner end wall and an open outer end, and a locking member in the groove and adapted to be inclosed with one of said recesses by the turning of said nut, substantially as described.

3. An improved nut-lock comprising a washer provided with a plurality of recesses, a nut having a plurality of recesses, the recesses in the nut extending thereinto in the direction of rotation when the nut is being screwed up and substantially transverse the washer-recesses, each recess having an open outer end and an inner end wall, and a locking member adapted to be placed within the washer-recess and inclosed by one of the nut-recesses when the latter is turned in a direction to unscrew it, substantially as described.

In testimony whereof I have hereunto set my hand in the presence of two subscribing witnesses.

JAMES C. CULBERTSON.

Witnesses:
 JOSEPH P. CULBERTSON,
 JOHN S. PORTER.